United States Patent
Holt et al.

(10) Patent No.: US 6,199,773 B1
(45) Date of Patent: Mar. 13, 2001

(54) FLUID AND AIR NOZZLE FOR HEADLIGHT CLEANING

(75) Inventors: Donald E. Holt, Woodburn; Chester E. Lundberg, Sherwood, both of OR (US)

(73) Assignee: Commercial Vehicle Systems, Inc., Canby, OR (US)

(*) Notice: Subject to any disclaimer, the term of this patent is extended or adjusted under 35 U.S.C. 154(b) by 0 days.

(21) Appl. No.: 09/451,257

(22) Filed: Nov. 29, 1999

Related U.S. Application Data
(60) Provisional application No. 60/138,897, filed on Jun. 11, 1999.

(51) Int. Cl.[7] .............................. B05B 1/10; B05B 1/28; B60S 1/46
(52) U.S. Cl. .................................. 239/284.1; 239/284.2; 239/295
(58) Field of Search .............. 239/284.1, 284.2, 239/292, 295, 587.1, 549

(56) References Cited

U.S. PATENT DOCUMENTS

| | | | |
|---|---|---|---|
| 1,752,923 | * 4/1930 | Mueller | 239/292 |
| 3,114,168 | 12/1963 | Taylor | 15/250.02 |
| 3,448,481 | 6/1969 | Jones, Jr. | 15/250.3 |
| 3,453,049 | 7/1969 | Wager, Jr. | 356/73 |
| 3,456,278 | 7/1969 | Mandy et al. | 15/250.02 |
| 3,493,804 | 2/1970 | Fennell | 313/110 |
| 3,641,613 | 2/1972 | Povilaitis et al. | 15/250.02 |
| 3,893,203 | 7/1975 | Berkelius | 15/250.22 |
| 3,915,385 | 10/1975 | Hassinger | 239/284 |
| 4,026,468 | 5/1977 | Tinder et al. | 239/66 |
| 4,026,473 | 5/1977 | Tinder et al. | 239/229 |
| 4,230,276 | 10/1980 | Tinder et al. | 239/229 |
| 4,323,266 | 4/1982 | Savage | 280/707 |
| 4,324,363 | 4/1982 | Rauen, Jr. | 239/284 A |
| 4,815,634 | 3/1989 | Nowicki | 222/133 |
| 5,083,339 | 1/1992 | Bristow | 15/250 A |
| 5,546,630 | 8/1996 | Long | 15/313 |
| 5,657,929 | 8/1997 | DeWitt et al. | 239/284.2 |

FOREIGN PATENT DOCUMENTS

| | | | |
|---|---|---|---|
| 724706 | * 9/1942 | (DE) | 299/140.1 |
| 808310 | * 7/1949 | (DE) | 239/295 |
| 2502389 | 7/1976 | (DE) | . |
| 3842375 | 7/1989 | (DE) | . |
| 2605906 | 10/1986 | (FR) | . |

* cited by examiner

Primary Examiner—Andres Kashnikow
Assistant Examiner—Davis Hwu
(74) Attorney, Agent, or Firm—Dellett and Walters

(57) ABSTRACT

Fluid and air nozzle assemblies are capable of propelling streams of a cleaning fluid and air mixture onto a vehicle headlight. These nozzle assemblies are mounted on a vehicle adjacent to the headlights and positioned such that liquid and air jets from the nozzles intersect prior to engaging the headlight to form a spray mixture that cleans the headlight. These nozzle assemblies have an adjustment feature for the purpose of aiming the fluid-air spray toward the headlight lens. The nozzle assemblies are associated with a control valve capable of connection in a pressurized air system on the vehicle and in the pressurized washer system for the windshield wipers and also capable of automatically directing liquid from the vehicle washer system and pressurized air on the vehicle to the liquid and air nozzles to form a headlight cleaning function upon manual activation of the pressurized windshield washer system of the vehicle.

15 Claims, 5 Drawing Sheets

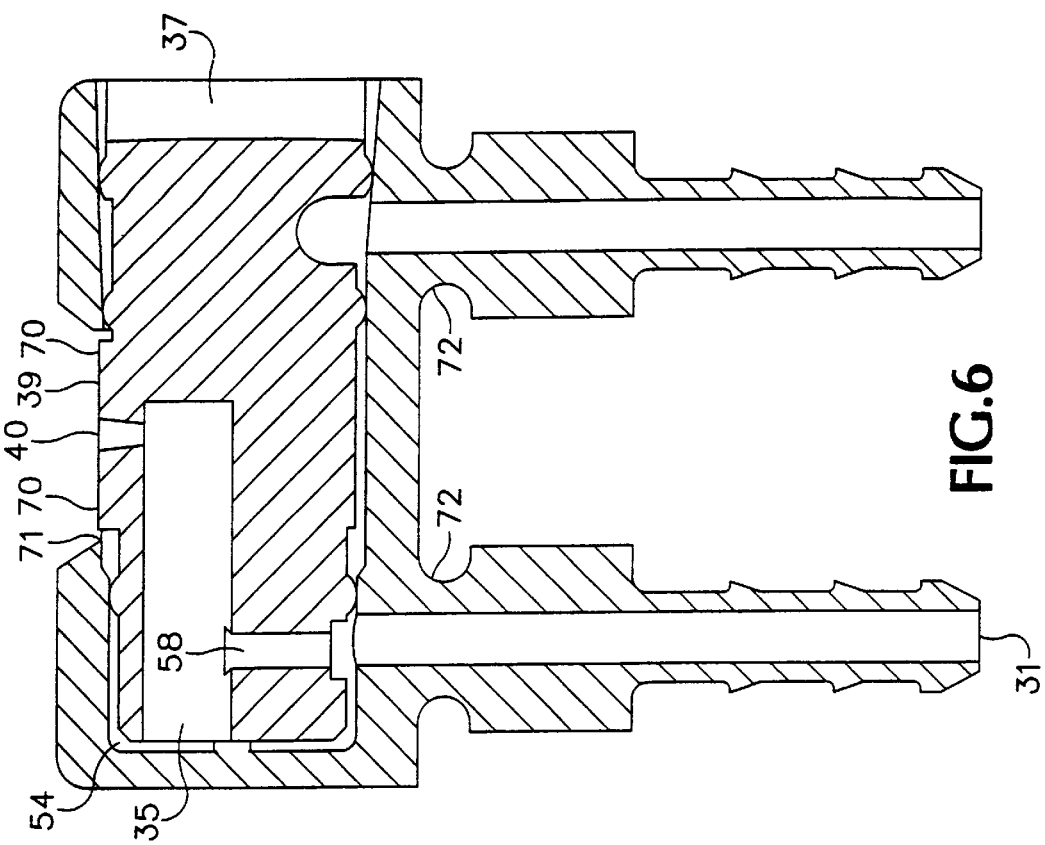
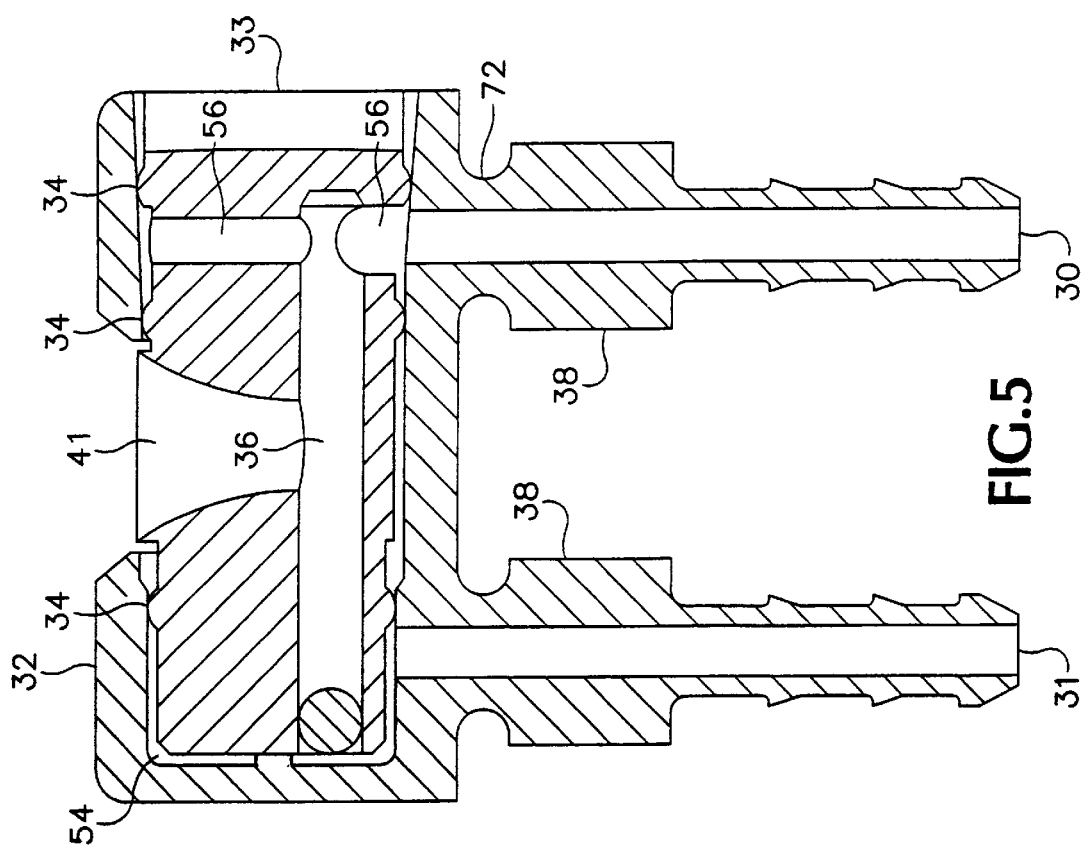
FIG. 6
FIG. 5

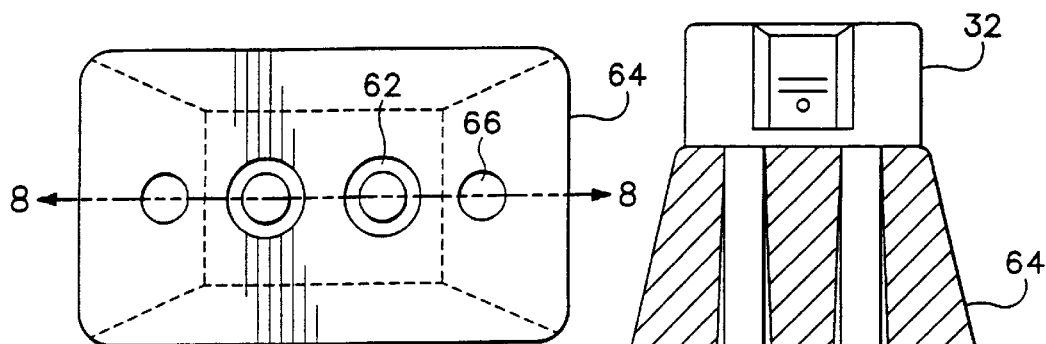
FIG.7
FIG.8
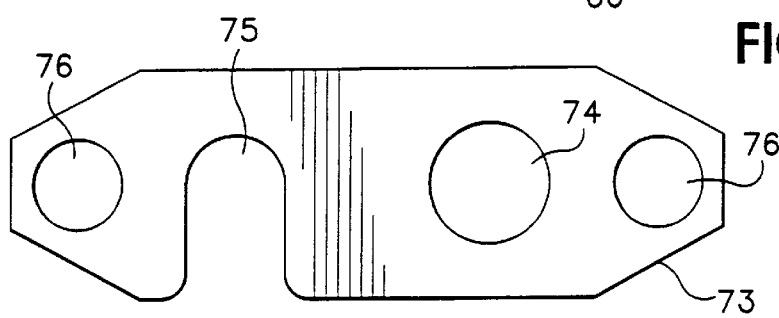
FIG.9
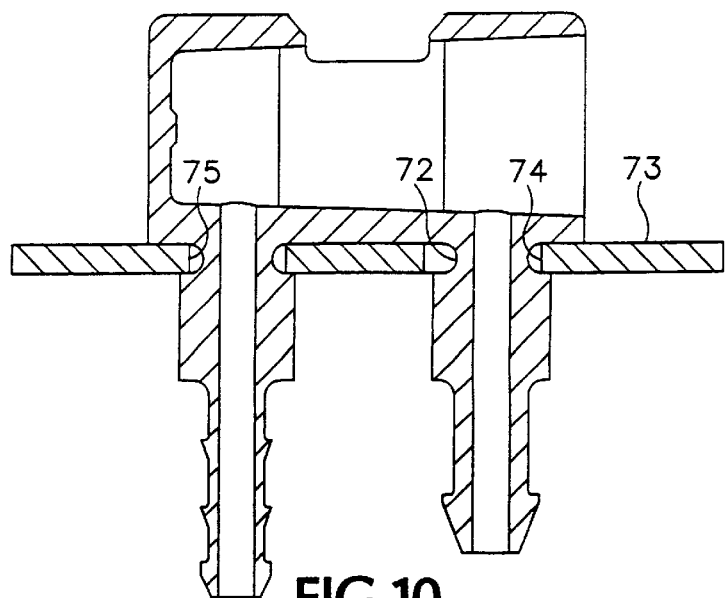
FIG.10

FLUID AND AIR NOZZLE FOR HEADLIGHT CLEANING

CROSS-REFERENCE TO RELATED APPLICATIONS

This application claims priority from U.S. Provisional Patent Application No. 60/138,897 filed Jun. 11, 1999, entitled FLUID AND AIR NOZZLE FOR HEADLIGHT CLEANING.

BACKGROUND OF THE INVENTION

This invention relates to a headlight cleaning apparatus and more particularly to a fluid and air nozzle for use with vehicles equipped with both pressurized air systems and pressurized windshield cleaning fluid systems, such as commonly found in commercial transport trucks and certain automobiles.

Due to the excessive mileage that commercial carriers undergo between washings, the headlight surfaces of transport trucks frequently become dirty or laden with snow and ice. Devices have been employed that clean headlights and it is known to direct pressurized air and fluid against headlights for this purpose as is shown in U.S. Pat. No. 3,469,088, U.S. Pat. No. 4,026,468 relates to a headlight cleaning assembly that cleans vehicle headlights by using first and second nozzles for jetting an air/fluid mixture against the headlight surface. U.S. Pat. No. 5,083,339 shows a lens cleaning apparatus employing a nozzle which cleans the lens in reciprocating movements of the arm.

A problem with the prior art is that most headlight washer nozzles are custom fitted to certain vehicles in the vicinity of the headlights, and are not adjustable. Thus, these nozzles are not readily fitted to other vehicles for either factory installations or after market installations.

SUMMARY OF THE INVENTION

In accordance with the present invention a fluid and air nozzle for headlight cleaning systems is provided for use with vehicles which have both pressurized air on board and a pressurized washer system for the windshield wipers. The invention includes a fluid outlet nozzle and an air outlet nozzle contained in a single housing capable of being directly mounted to the outer skin of the vehicle in the vicinity of the headlights. The air outlet nozzle is positioned so as to combine its air jet with a jet of cleaning fluid from the fluid outlet nozzle so as to form a spray that impinges forcefully against the headlight lens thereby cleaning the headlight.

In a preferred embodiment, the nozzle is adapted to provide an adjustable trajectory for the spray stream of the combined air and headlight cleaning fluid.

It is therefore an object of the invention to provide an improved fluid-air system for cleaning headlights on vehicles.

It is another object of the invention to provide a fluid-air headlight cleaning system for vehicles of the type that have pressurized air on board and also have a manually activated pressurized windshield washer system in combination with the windshield wipers, the washer system having nozzle outlets capable of being mounted adjacent the headlights and also having valve means that automatically activate the headlight cleaning system upon activation of the windshield washer system.

Another object of the invention is to provide an improved headlight cleaning system for a vehicle that is separate and independent of the vehicle windshield washing system.

A further object of the invention is to provide a fluid-air nozzle for a vehicle headlight cleaning system that allows for adjustment of the trajectory of the fluid-air spray stream that impinges upon the headlight lenses.

Yet another object of the invention is to provide a fluid-air nozzle for a vehicle headlight cleaning system that allows for positioning the nozzle on the vehicle in the vicinity of the headlight to attain optimal cleaning.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 5 is a cross-sectional front view of the third embodiment of a fluid-air nozzle illustrating the air passages through the rotatable adjustment spool as taken through line 5—5 of FIG. 4;

FIG. 6 is a cross-sectional view of the third embodiment of a fluid-air nozzle illustrating the fluid passages through the rotatable adjustment spool as taken through line 6—6 of FIG. 4;

FIG. 7 is a bottom view of an exemplary mounting bracket for use with the second and third embodiments of the fluid-air nozzle;

FIG. 8 is a cross-section view of an exemplary mounting bracket with the third embodiment fluid-air nozzle according to the present invention mounted thereon as taken through line 8—8 of FIG. 7;

FIG. 9 is a view of a mounting bracket for use in connection with the invention; and FIG. 10 is a cross-sectional view of the nozzle housing and bracket assembly.

DETAILED DESCRIPTION

In accordance with the present invention, three embodiments of a headlight cleaning nozzle are shown, wherein the embodiments employ pressurized air, as is typically available for accessory purposes on heavy trucks and certain automobiles, and momentarily pressurized windshield washer fluid, as is typically available on such vehicles for the purpose of cleaning the windshield. The air and washer fluid are ejected from separate orifices in the headlight cleaning nozzle merging a short distance therefrom and are and propelled onto the surface of the headlight.

Figure 1:
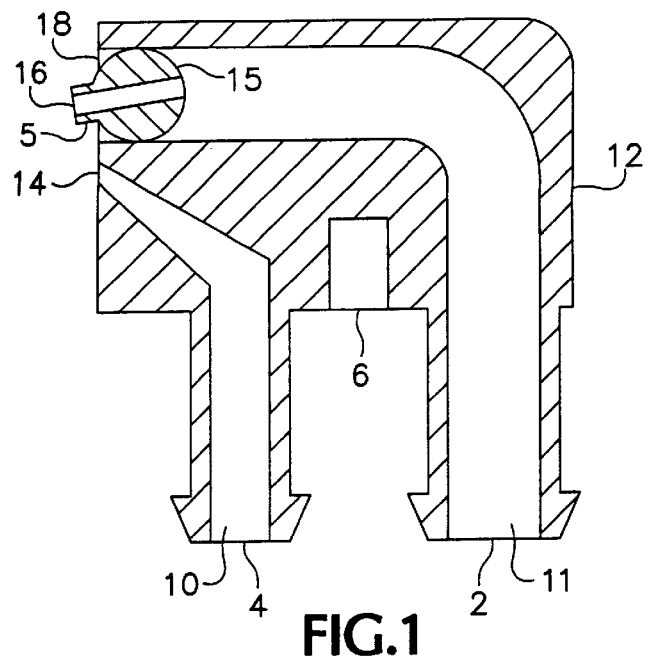
FIG. 1 is a cross-sectional view of a first embodiment of a fluid-air nozzle illustrating the rotatable air spool for adjusting the fluid-air spray trajectory according to the present invention.

Referring to FIG. 1, a cross-sectional view of a first embodiment of a fluid-air nozzle, in the first embodiment of the present invention, a nozzle body 12 is configured so as to define air passage 2 and fluid passage 4 therein. Fluid passage 4 defines openings in nozzle body 12 at a fluid inlet fitting 10 and a fluid exit orifice 14. Air passage 2 defines openings in nozzle body 12 at an air inlet fitting 11 and an air exit 18. Air passage 2 houses a cylindrical rotatable air spool 15 in air exit 18 of nozzle body 12. A shoulder 5 is defined along the longitudinal axis of air spool 15. An air exit orifice 16 is formed through air spool 15, centrally located within shoulder 5. A mounting hole 6 is defined in nozzle body 12 between air inlet fitting 11 and fluid inlet fitting 10. The inlets and outlets are at right angles to each other in the illustrated embodiment.

Air spool 15 is frictionally engaged in air passage 2 so as to maintain alignment of air spool 15 within nozzle body 12 in absence of adjustment by a user and to act as a seal forcing all of the air stream through air exit orifice 16. Application of a force (i.e., most likely from a finger) to shoulder 5 of air spool 15 will cause air spool 15 to rotate about its longitudinal axis within air passage 2, thereby altering the trajectory of the air jet therethrough. The amount of rotation that air spool 15 can undergo is limited by the abutment of shoulder 5 against nozzle body 12 in the vicinity of air exit 18. Changing the rotational position of air spool 15 directs the trajectory of the combined fluid-air stream onto the headlight.

Fluid inlet fitting 10 and air inlet fitting 11 are provided with exterior barbs that are intended to accept and retain flexible tubing suitable for the transfer of the fluid and air from the headlight cleaning system to the nozzle body 12. Nozzle body 12 is suitably fastened onto the vehicle skin adjacent to the headlights by a fastening means such as a screw which is frictionally engaged into mounting hole 6. An alternate mounting method would employ a suitable fastening means installed over the shank of air inlet fitting 11 and fluid inlet fitting 10, such as a clamp or a push-on retainer.

Heavy trucks and certain other vehicles have air systems that supply pressurized air to functioning parts of the vehicle as well as a pressurized washer system that is directly associated with windshield wipers. This washer system for the windshield wipers employs an activating switch located in the cab of the vehicle. Activation of this switch simultaneously turns on the reciprocating drive means for the wipers and a pump that supplies washer fluid to the windshield cleaning system and the headlight cleaning system. The fluid pressure within the headlight cleaning system causes an in-line fluid piloted air relay valve to open the air valve. The washer fluid and air are then delivered by suitable tubing to the headlight washer nozzles where the separate air and fluid streams (jets) are ejected from the nozzle so as to intersect. The power resulting from the compressed air expanding disperses the fluid stream thereby determining the spray pattern and trajectory as well as propelling the combined fluid-air stream onto the headlight lenses. A separate headlight washing only system may also be provided to operate independently of the windshield washing system.

Figure 2:
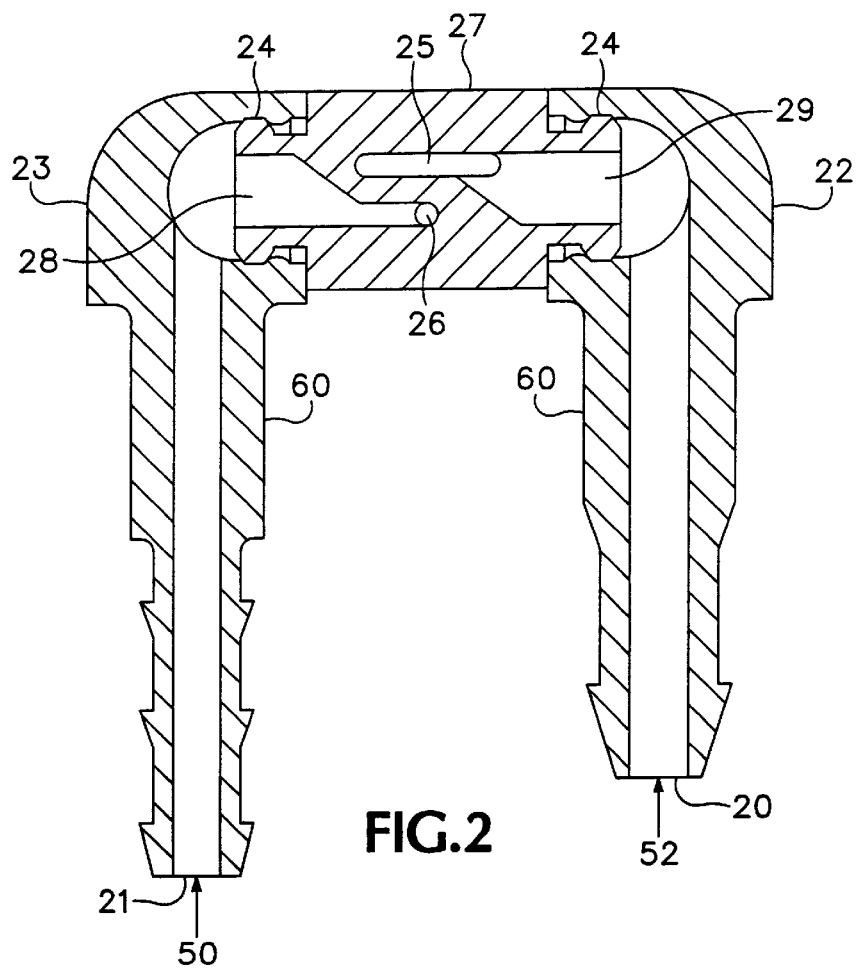
FIG. 2 is a cross-sectional view of a second embodiment of a fluid-air nozzle illustrating the rotatable fluid-air spool for adjusting the trajectory of the fluid-air spray stream according to the present invention.
Figure 3:
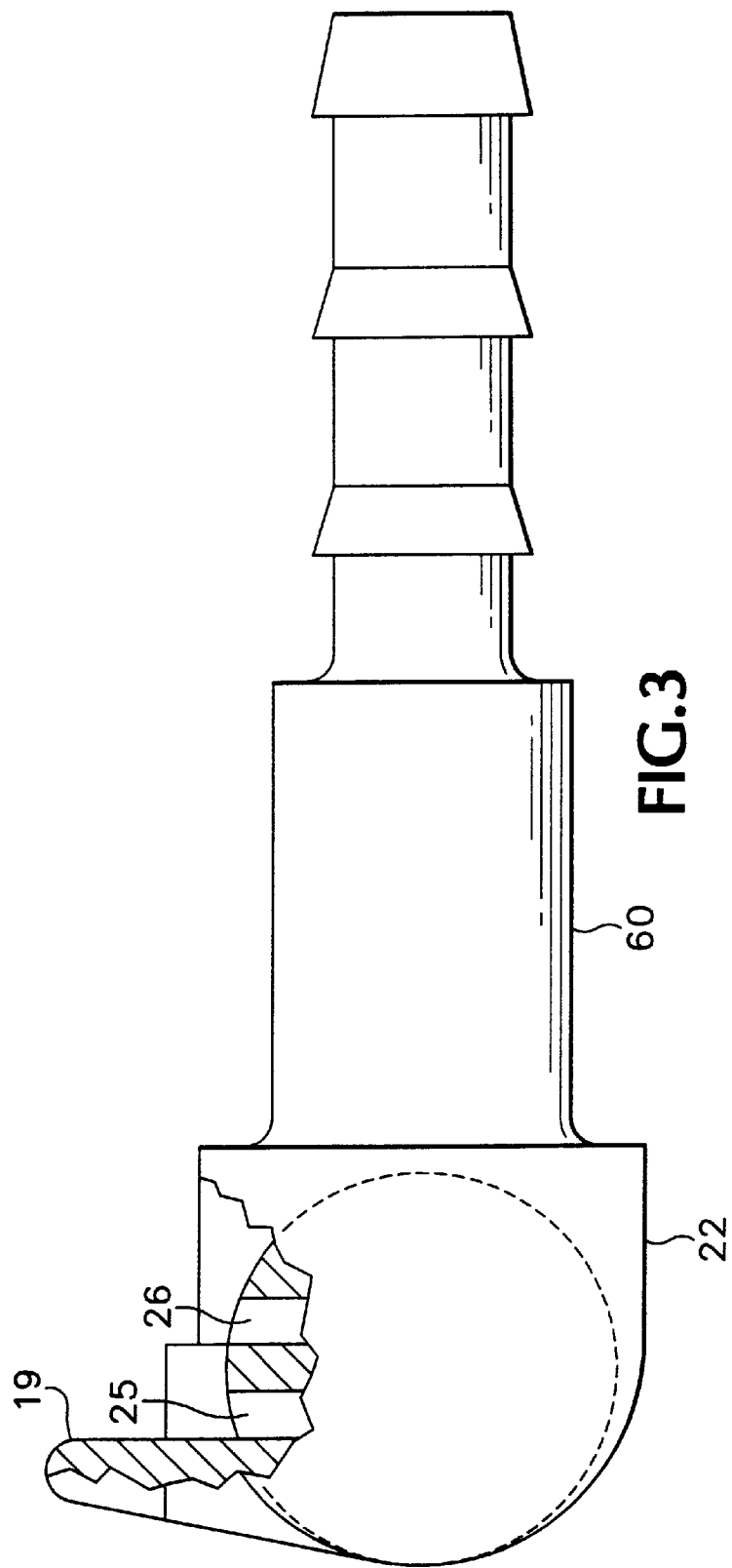
FIG. 3 is a perspective side view of the second embodiment of a fluid-air nozzle illustrating a partial cutaway view of the manual rotatable adjustment spool for adjusting the trajectory of the fluid-air spray stream.

Referring to FIGS. 2 and 3, cross-sectional and perspective side views respectively, illustrating the second embodiment of the present invention, a body is provided having a generally cylindrical rotatable spool 27 therein. One end of rotatable spool 27 contains a fluid flow channel 28 which is oriented generally parallel to the longitudinal axis of spool 27 and terminates at fluid exit orifice 26 approximately midpoint of spool 27. The distal end of spool 27 contains an air flow channel 29 which is oriented generally parallel to the longitudinal axis of spool 27 and terminates at an air exit orifice 25 which is substantially centered above fluid exit orifice 26 and positioned midpoint of spool 27. Both exterior surface ends of spool 27 have a circumferential sealing profile 24 which frictionally connects spool 27 to a fluid endcap 23 and an air endcap 22.

Spool 27 includes two circumferential sealing profiles 24 which accommodate an interference fit between air endcap 22 and fluid endcap 23. Both endcaps are longitudinally bored and have exterior barbs to accommodate suitable transfer hoses for the air and fluid. The interference fit forms an airtight and fluidtight seal and retains fluid endcap 23 and air endcap 22 onto spool 27. Spool 27 is bored from either end so as to have two flow channels, fluid flow channel 28 and air flow channel 29. Fluid flow channel 28 allows fluid stream 50 to transfer from fluid inlet 21 of fluid endcap 23 to the fluid exit orifice 26 at the center of spool 27, and air flow channel 29 allows air stream 52 to transfer from air inlet 20 of air endcap 22 to the air exit orifice 25 at the center of spool 27. Air exit orifice 25 and fluid exit orifice 26 are adjacently positioned and fixedly located midpoint of spool 27. Spool sealing profiles 24 are mated to fluid endcap 23 and air endcap 22 such that spool 27 is able to maintain a fluid and air seal while being rotated relative to the endcaps for the purpose of adjusting the trajectory of both the fluid and air streams. It can therefore be seen that in this nozzle embodiment, the trajectory of both the fluid stream 50 and air stream 52 can simultaneously be adjusted by rotating spool 27 about its axis.

Fluid exit orifice 26 gives the fluid stream a trajectory parallel to the air stream. Air exit orifice 25 directs the air toward the headlight surface and is fashioned such that the exiting and expanding air stream is formed into a somewhat wide, flattened shape for cleaning the maximum possible area of the headlight. An adjustment tab 19 protrudes from spool 27 for manual rotation of spool 27, thereby allowing the adjustment of the trajectory of the fluid-air stream.

This embodiment of the headlight washer nozzle can suitably be mounted to the vehicle by insertion of air endcap 22 and fluid endcap 23 through holes drilled in the skin of the vehicle and placement of a suitable fastener onto boss 60 of each endcap. The headlight washer nozzle may also be mounted onto a pedestal bracket 64 (as discussed hereinbelow in connection with FIG. 8).

Figure 4:
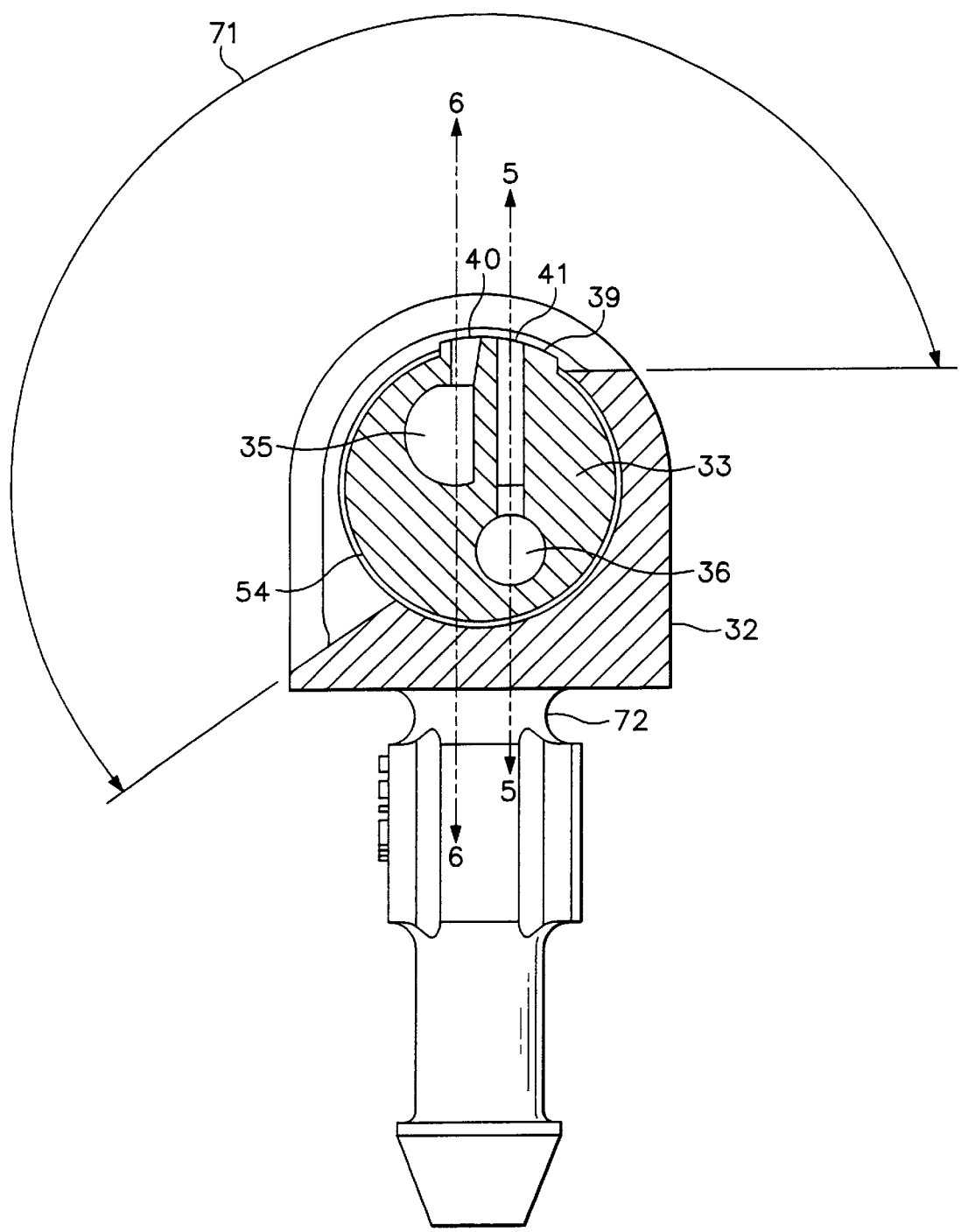
FIG. 4 is a cross-sectional side view taken midpoint of a third embodiment of a fluid-air nozzle illustrating the general design of the rotatable adjustment spool within the nozzle housing according to the present invention.

Referring now to FIGS. 4–6, which comprise sectional views of a third embodiment of the present invention, rotatable spool 33 is frictionally secured within spool recess 54 of nozzle housing 32 by spool sealing profiles 34 located circumferentially on rotatable spool 33. Perpendicular to the longitudinal axis of spool 33, nozzle housing 32 incorporates longitudinally bored air inlet fitting 30 and longitudinally bored fluid inlet fitting 31. Spool 33 contains axially bored air flow channel 36 that perpendicularly intersects air transfer channel 56 and air outlet orifice 41. Spool 33 also contains axially bored fluid flow channel 35 that perpendicularly intersects fluid transfer channel 58 and fluid outlet orifice 40.

It can be seen that the function of the third embodiment of the headlight washer nozzle is correspondent to that of the second embodiment in that each of these embodiments has a rotatable spool 33 that transmits the air and fluid from their respective inlet fittings to their respective outlet orifices.

This embodiment of the adjustable nozzle uses a single piece housing 32 which incorporates both air inlet fitting 30 and fluid inlet fitting 31. Nozzle housing 32 has a spool recess 54 bored therein to frictionally receive spool 33. Spool 33 has three circumferential spool sealing profiles 34 which compress to create seals for the compressed air and fluid when spool 33 is installed into spool recess 54. Seal profiles 34 also serve as sliding surfaces on which spool 33 can revolve within nozzle housing 32. The compression of seal profiles 34, while allowing the spool to be rotated, also frictionally prevents spool 33 from coming out of alignment within nozzle housing 32 due to mechanical vibration.

Perpendicular to the axis of spool 33, nozzle housing 32 incorporates longitudinally bored air inlet fitting 30 and longitudinally bored fluid inlet fitting 31. Spool 33 has longitudinally bored air flow channel 36 that perpendicularly intersects air transfer channel 56 and air outlet orifice 41. This enables the transfer of air from air inlet fitting 30 through to air outlet orifice 41 located midpoint on spool 33, throughout the available range of rotation of spool 33. Spool 33 also has a longitudinally bored fluid flow channel 35 that intersects perpendicular fluid transfer channel 58 and perpendicular fluid outlet orifice 40. This enables the transfer of fluid from fluid inlet fitting 31 through to fluid outlet orifice 40 located midpoint on spool 33 throughout the available range of rotation of spool 33. Fluid outlet orifice 40 is located adjacent to air outlet orifice 41. The fluid flow and air flow are separate within nozzle housing 32 and are mixed upon ejection from their respective outlet orifices in spool 33.

Fluid outlet orifice 40 directs a jet of fluid toward the headlight lens. Air outlet orifice 41 directs air toward the headlight and is configured such that the exiting and expanding air stream is formed into a wide, flattened shape for cleaning the maximum possible area of the headlight lens. Spool 33 is rotatable within nozzle housing 32 for the purpose of adjusting the nozzle orifices so that the fluid and air stream trajectory impinges upon the headlight surface in a manner to provide effective cleaning for a wide variety of vehicle applications. Spool 33 is rotated via screw driver slot 37. Slot 37 is aligned with exit orifices 40 and 41, thereby providing a means of visually indicating the direction of the fluid and air stream.

Spool 33 is retained in housing 32 by raised shoulder 70 which is centrally located on the surface of spool 33 and through which air outlet orifice 41 and fluid outlet orifice 40 extend. Shoulder 70 contributes to the interference fit of spool 33 into spool recess 54 and prevents spool 33 removal. Shoulder 70 makes contact with nozzle housing 32 at the extremes of its rotational range, thereby providing rotational travel stops. These rotational stops maintain the nozzle orifices within an exit window 71 of the housing. Spool 33 may be retained in housing 32 by other means such as a snap-fit or by addition of a suitable fastener such as a pin or a screw or a retaining ring.

Nozzle housing 32 may be mounted by various methods, dependent upon the physical characteristics of the area surrounding the headlight it is intended to clean. One method is to fasten the nozzle assembly directly to the vehicle skin in a position adjacent to the headlight. Nozzle housing 32 incorporates bosses 38 at the base of inlet fittings 30 and 31 that accept suitable fasteners, for example, of either the push-on or self-threading screw-on variety. The purpose of this fastener is to secure the nozzle to the vehicle once nozzle fittings 30 and 31 are inserted through holes drilled through the vehicle skin.

The design of air inlet fitting 30 and fluid inlet fitting 31 corresponds to those of the other embodiments with respect to the barb profiles for hose attachment. One method of mounting the nozzle housing 32 to the vehicle skin is substantially similar to that method of affixation described in the previous embodiment.

Another manner of mounting, with reference to FIG. 6, together with FIG. 9, a view of a mounting bracket for use in connection with the invention and FIG. 10, a cross-sectional view of the nozzle housing and bracket assembly, is accomplished via a groove 72 added where housing 32 and bosses 38 join. The grooves 72 mate with hole 74 and slot 75 in mounting bracket 73. Holes 76 are provided in bracket 73 to give clearance for a fastener, such as a screw, for attaching the nozzle and bracket assembly to the vehicle. Together, these two components provide a manner of securing the nozzle assembly to a vehicle skin where it might not be possible to install push-on retainers, due to accessibility constraints. The illustrated bracket mounting structure may also be used to secure the nozzle assembly to a standoff.

Referring now to FIGS. 7 and 8, an example of a mounting bracket for use with the second and third embodiment of the present invention is shown. The mounting bracket 64 has a pedestal configuration with two tapered holes 62 therethrough and two mounting holes 66 therein. Where an optimal skin-mounted location is impractical, nozzle housing 32 may be installed atop bracket 64 in order to attain the necessary attitude for optimal headlight cleaning. A suitable means of securing the nozzle assembly to bracket 64 is provided, as well as a means of securing bracket 64 and the nozzle assembly to the vehicle. One manner of securing the nozzle to bracket 64 is by a press fit, where the tubing is forced into restricted diameter bore 62 of bracket 64. This may also be accomplished by means of a suitable fastener, an example of such being a common set screw or retaining pin. Adhesive bonding is another possible fastening means. Bracket 64 may be affixed by one or more fasteners, threaded or otherwise. One possibility is shown in FIGS. 7 and 8, wherein tapped holes 66 are provided for securing the bracket to the vehicle skin with threaded fasteners. Another manner is to incorporate plain holes with the use of self-threading fasteners.

Other variations to the illustrated design may be made while retaining the function of the invention. For example, the sealing function of the circumferential seals may also be accomplished by the addition of elastomeric 0-rings or other corresponding seals. Also, as noted hereinabove, other ways to retain the spool in the housing may be used, such as by a snap fit or by the addition of a fastener such as a roll pin, retaining ring or screw.

Regardless of which embodiment of the headlight washer nozzle is used, operation of the headlight cleaning system is substantially correspondent between the various embodiments and proceeds as discussed herein. (This headlight cleaning system and the corresponding relay valve are described in U.S. Pat. No. 5,657,929, issued Aug. 19, 1997, assigned to the assignee of the present application and herein incorporated by reference.) While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A fluid-air headlight cleaning nozzle, said nozzle comprising:

a rotatable spool with an air outlet orifice and a fluid outlet orifice;

an air endcap in communication with said rotatable spool to provide an air input to said rotatable spool; and a fluid endcap in communication with said rotatable spool to provide a cleaning fluid input to said rotatable spool, wherein the air input exits as a jet of air from said air outlet orifice and the cleaning fluid input exits as a jet of cleaning fluid from said fluid outlet orifice, said jet of air and said jet of cleaning fluid joining so as to form a spray mixture that is propelled toward a headlight of a vehicle.

2. The air-fluid headlight cleaning nozzle according to claim 1 where said spool comprises:

a first circumferential sealing surface that frictionally engages said air endcap to said spool; and a second circumferential sealing surface that frictionally engages said fluid endcap to said spool, wherein said sealing surfaces act as seals between said spool and said endcaps, and maintain a surface for rotation of said spool.

3. The fluid-air headlight cleaning nozzle according to claim 1 further comprising mounting means capable of mounting said fluid-air nozzle body on a vehicle.

4. The air-fluid headlight cleaning nozzle according to claim 1 wherein said nozzle is adapted for use in headlight cleaning systems on vehicles of the type which have pressurized air on board and also a pressurized washer system for windshield wipers.

5. A fluid-air headlight cleaning nozzle, said nozzle comprising:

a fluid-air nozzle body with an air inlet fitting and a fluid inlet fitting; and a rotatable spool with an air outlet orifice and a fluid outlet orifice, said rotatable spool being in fluid communication with said air inlet fitting, and receiving an air supply therefrom, and providing a jet of air from said air outlet orifice based on the air supply, and said rotatable spool being in fluid communication with said fluid inlet fitting, and receiving a fluid supply therefrom, and providing a jet of cleaning fluid from said fluid outlet orifice based on the fluid supply, wherein the jet of air from said air outlet orifice intersects the jet of cleaning fluid from said fluid outlet orifice so as to form a spray mixture that is directed toward a headlight of a vehicle.

6. The fluid-air headlight cleaning nozzle according to claim 5 further comprising a mounting means capable of mounting said fluid-air nozzle body on a vehicle.

7. The air-fluid headlight cleaning nozzle according to claim 5 wherein said nozzle is adapted for use in headlight cleaning systems on vehicles of the type which have pressurized air on board and also a pressurized washer system for windshield wipers.

8. The air-fluid headlight cleaning nozzle according to claim 5 wherein said spool comprises a plurality of circumferential sealing surfaces that frictionally engage said fluid-air nozzle body to act as a seal between said spool and said nozzle body and to maintain alignment of said spool within said nozzle body.

9. The air-fluid headlight cleaning nozzle according to claim 5 wherein said spool comprises a shoulder that abuts said nozzle body thereby acting as rotational travel stop for said spool, and preventing the removal of said spool from said nozzle body.

10. The air-fluid headlight cleaning nozzle according to claim 5 further comprising a sealing member to act as a seal between said spool and said nozzle body and to maintain alignment of said spool within said nozzle body.

11. The air-fluid headlight cleaning nozzle according to claim 10 wherein said sealing member comprises an elastomeric o-ring.

12. The air-fluid headlight cleaning nozzle according to claim 5 further comprising a snap fit member for preventing the removal of said spool from said nozzle body.

13. The air-fluid headlight cleaning nozzle according to claim 5 further comprising a roll pin for preventing the removal of said spool from said nozzle body.

14. The air-fluid headlight cleaning nozzle according to claim 5 further comprising a retaining ring for preventing the removal of said spool from said nozzle body.

15. The air-fluid headlight cleaning nozzle according to claim 5 further comprising a screw member for preventing the removal of said spool from said nozzle body.

* * * * *